Patented Jan. 4, 1944

2,338,639

UNITED STATES PATENT OFFICE 2,338,639

MANUFACTURE OF AZO DYESTUFFS

John Stanley Heaton and Cyril Cuttell Howis, Glossop, Derby, England, assignors to The Calico Printers' Association Limited, Manchester, England, a British company No Drawing. Application April 9, 1941, Serial No. 387,770. In Great Britain April 4, 1940

2 Claims. (Cl. 8—45)

This invention relates to the manufacture of insoluble azo dyestuffs, in particular on the fibre, and to the intermediate preparations used in the production of such dyestuffs.

It is known that stable preparations containing diazo-amino compounds mixed with coupling components in alkaline medium may be made which, when treated with acid, produce insoluble azo dyestuffs. When these preparations are applied to textile fibres, as, for example, in a printing paste, the insoluble azo dyestuffs are usually developed on the fibre by treatment in a bath containing aqueous acid or in an atmosphere of steam and acid vapours.

Since this acid treatment has certain disadvantages in practice, particularly because it prevents the application in printing of vat colours along with the above mentioned preparations, attempts have been made to avoid it either by incorporating in the preparations agents capable of splitting off acids at elevated temperatures, or by arranging that the alkaline medium, instead of being an alkali hydroxide, is composed wholly or partly of volatile bases, so that by steaming only a condition is brought about which allows the insoluble azo dyestuffs to develop. Preparations such as these have not, however, been commonly adopted since they are somewhat unstable under practical conditions.

The present invention has for its object to provide preparations which are stable under practical conditions pending and during their application to fabrics, but from which insoluble azo colours may be developed by steaming only without the use of acid, and which will therefore be suitable for application in printing along with vat colours.

According to the invention, such preparations are formed by mixing a coupling component, such as naphthol, with a diazo-amino compound formed by reacting an amino-carboxylic acid with a diazo compound obtained by diazotizing an amino derivative of benzene in which any substituent group in the nucleus, apart from the amine group, are aliphatic positive groups, such diazo-amine compounds, being capable of splitting up on steaming even in the complete absence of acid.

By the expression "positive group" is meant a group which enhances the basic character of the amine group. Such groups are alkyl and alkoxy groups.

The diazotisable amines which have been found suitable for the formation of diazo-amino compounds which split up in neutral steam are aniline, and substituted anilines containing one or more alkyl or alkoxy groups in the nucleus, as for instance, o-, m-, and p-toluidines, o- and p-anisidines, p-phenetidine, 4-m-xylidine, p-xylidine and ψ-cumidine.

Suitable amino-carboxylic acids are, for instance, o-, m-, and p-amino benzoic acids, 3-amino 4-methyl benzoic acid.

The invention is illustrated by the following examples:

1. 7½ lbs. of para-xylidine are diazotised in the usual manner and poured into a solution containing 9¾ lbs. of anthranilic acid and 24¼ lbs. of anhydrous sodium carbonate. The sodium salt of the diazo-amino compound separates and is gathered as a smooth thick paste when the reaction is complete. This paste, preferably without drying, is mixed with a solution containing 11¼ lbs. di- (acetoacetyl)-ortho-tolidine and 7½ lbs. 90° T. caustic soda, and the caustic soda, and the mixture thickened in the usual manner with neutral or weakly caustic thickening. This printing paste is applied to the fibre, and by merely steaming a yellow colour is developed.

2. The paste of diazo-amino sodium salt described in Example 1 is mixed with a solution containing 15 lbs. of 2.3 hydroxynaphthoic acid anilide and 7½ lbs. of 90° T. caustic soda. The mixture is thickened in the usual manner with neutral or weakly caustic thickening. This printing paste is applied to the fibre and by merely steaming a scarlet colour is developed.

3. 7½ lbs. of ψ-cumidine are diazotised in the usual manner and poured into a solution containing 8½ lbs. of anthranilic acid and 21½ lbs. anhydrous sodium carbonate. The sodium salt of the diazoamino compound separates and is gathered as a smooth thick paste when the reaction is complete. This paste, preferably without drying, is mixed with a solution containing 11¼ lbs. di-(acetoacetyl)-ortho-tolidine and 7½ lbs. 90° T. caustic soda, and the mixture thickened in the usual manner with neutral or weakly caustic thickening. This printing paste is applied to the fibre and by merely steaming a yellow colour is developed.

What we claim is:

1. A process for printing and dyeing textile fibres with insoluble azo dyestuffs developed on the fibre, comprising diazotising a substance selected from the group consisting of aniline, alkyl derivatives of aniline, and alkoxy derivatives of aniline, reacting the diazo compound formed with an amino-monocarboxylic acid of the benzene series which is free from sulphonamide and sulphonic acid groups, in the presence of a fixed alkali, to form an alkali salt of a diazo-amino compound, mixing such salt with a solution containing a coupling component and a fixed alkali, adding a thickener to the mixture, applying the mixture to the textile fibre and steaming with steam free from acid.

2. A stable preparation suitable for application to textile fibres and from which an insoluble azo dyestuff can be developed on the fibre by the action of steam alone, comprising a mixture of a coupling component, and an alkali salt of a diazo-amino compound resulting from the reaction, in the presence of a fixed alkali, of a monoamino-monocarboxylic acid of the benzene series which is free from sulphonamide and sulphonic acid groups with a diazo compound obtained by diazotising a substance selected from the group consisting of aniline, alkyl derivatives of aniline and alkoxy derivatives of aniline.

JOHN STANLEY HEATON.
CYRIL CUTTELL HOWIS.